United States Patent
Lin et al.

(10) Patent No.: US 9,214,190 B2
(45) Date of Patent: Dec. 15, 2015

(54) AUDIO SIGNAL PROCESSING METHOD

(75) Inventors: Yi-Chun Lin, Chiayi (TW); Wen-Haw Wang, Keelung (TW); Kai-Hsiang Chou, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 1034 days.

(21) Appl. No.: 12/419,563

(22) Filed: Apr. 7, 2009

(65) Prior Publication Data

US 2009/0257335 A1 Oct. 15, 2009

(30) Foreign Application Priority Data

Apr. 9, 2008 (TW) .............................. 97112862 A

(51) Int. Cl.
| | |
|---|---|
| *G06F 17/00* | (2006.01) |
| *G11B 27/034* | (2006.01) |
| *G10L 21/04* | (2013.01) |
| *G11B 27/10* | (2006.01) |

(52) U.S. Cl.
CPC .............. *G11B 27/034* (2013.01); *G10L 21/04* (2013.01); *G11B 27/105* (2013.01)

(58) Field of Classification Search
USPC ..................................... 700/94; 704/500–504
See application file for complete search history.

(56) References Cited

U.S. PATENT DOCUMENTS

| | | | |
|---|---|---|---|
| 5,583,652 A | 12/1996 | Ware | |
| 5,630,013 A | 5/1997 | Suzuki et al. | |
| 6,718,390 B1 | 4/2004 | Still et al. | |
| 7,149,412 B2 | 12/2006 | Blair et al. | |
| 7,236,837 B2 * | 6/2007 | Matoba | 700/94 |
| 7,328,076 B2 * | 2/2008 | Sakurai et al. | 700/94 |
| 7,526,351 B2 * | 4/2009 | He et al. | 700/94 |
| 7,580,761 B2 * | 8/2009 | Sakurai et al. | 700/94 |
| 7,584,008 B2 * | 9/2009 | Kondo et al. | 700/94 |
| 2002/0065569 A1 * | 5/2002 | Matoba | 700/94 |
| 2003/0105539 A1 * | 6/2003 | Chang | 700/94 |
| 2004/0122662 A1 * | 6/2004 | Crockett | 704/200.1 |
| 2006/0277052 A1 * | 12/2006 | He et al. | 704/503 |
| 2007/0094031 A1 * | 4/2007 | Chen | 704/267 |

FOREIGN PATENT DOCUMENTS

TW        1259994 B       8/2006

* cited by examiner

*Primary Examiner* — Andrew C Flanders
(74) *Attorney, Agent, or Firm* — McClure, Qualey & Rodack, LLP

(57) ABSTRACT

An audio signal processing method includes the steps of: dividing an audio signal data stream into a plurality of selection segments; determining a target segment in the audio signal data stream, the target segment including a splice point for splicing a splice segment thereto; selecting one of the selection segments as the splice segment according to at least one parameter of the target segment; and processing the target segment and the splice segment to splice the splice segment to the target segment, and outputting a processed segment.

10 Claims, 5 Drawing Sheets

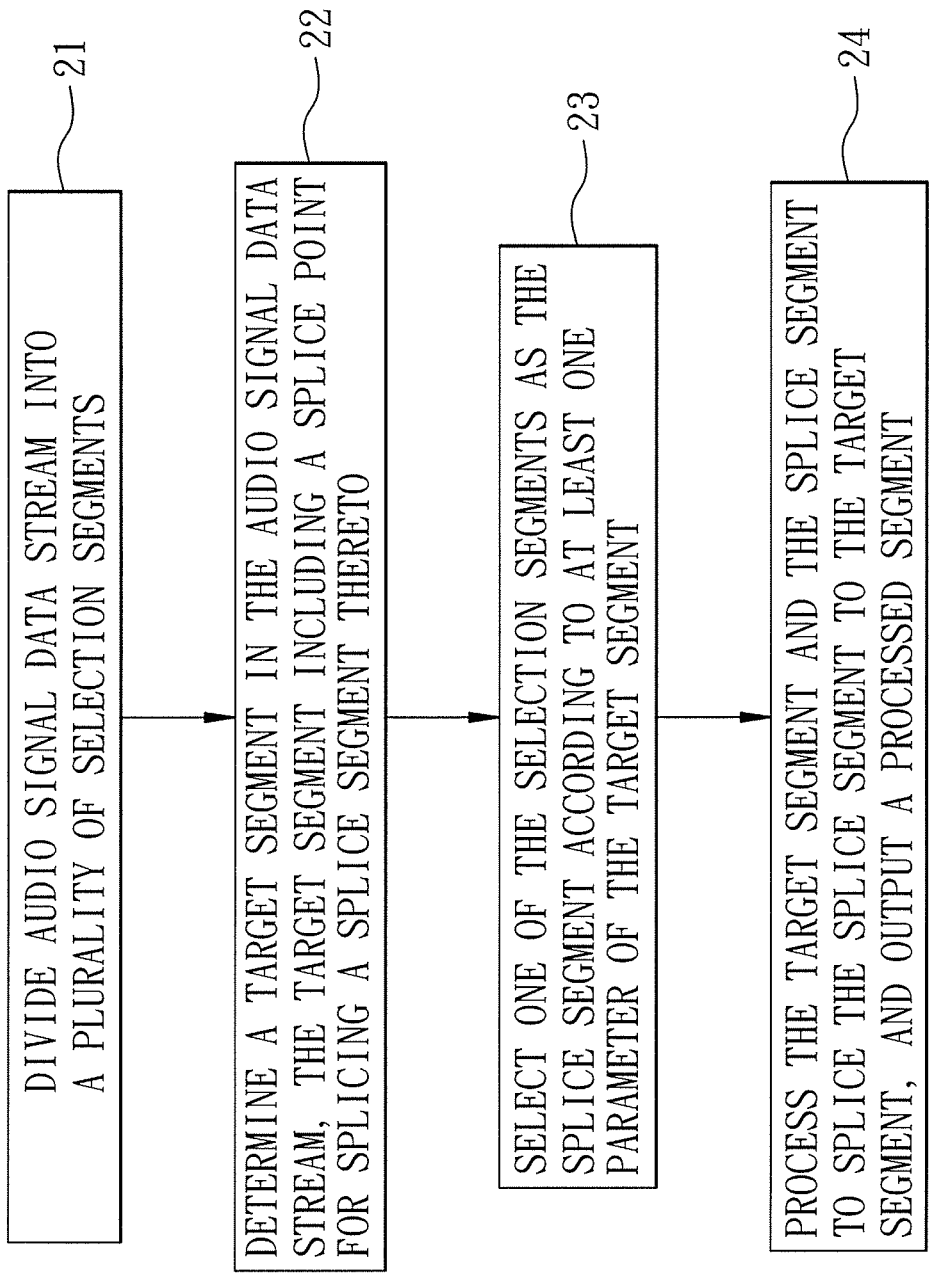
F I G. 2

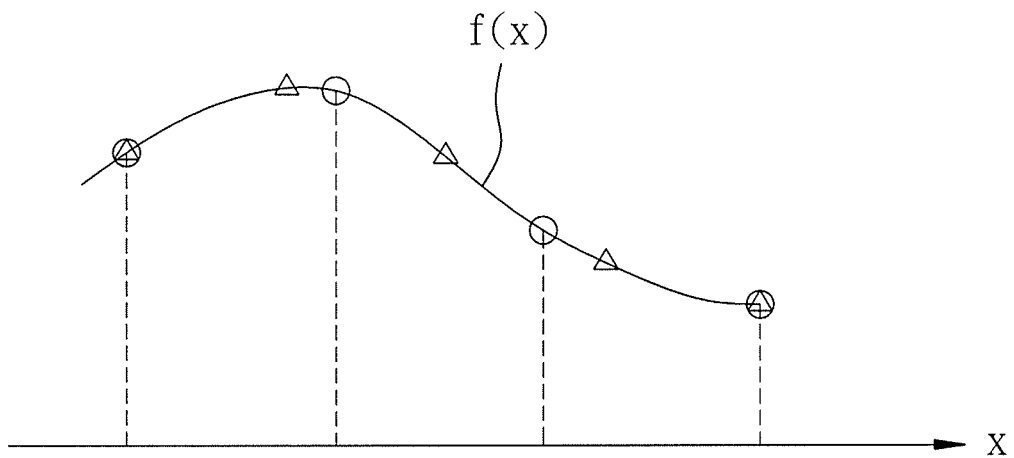
F I G. 5(a)
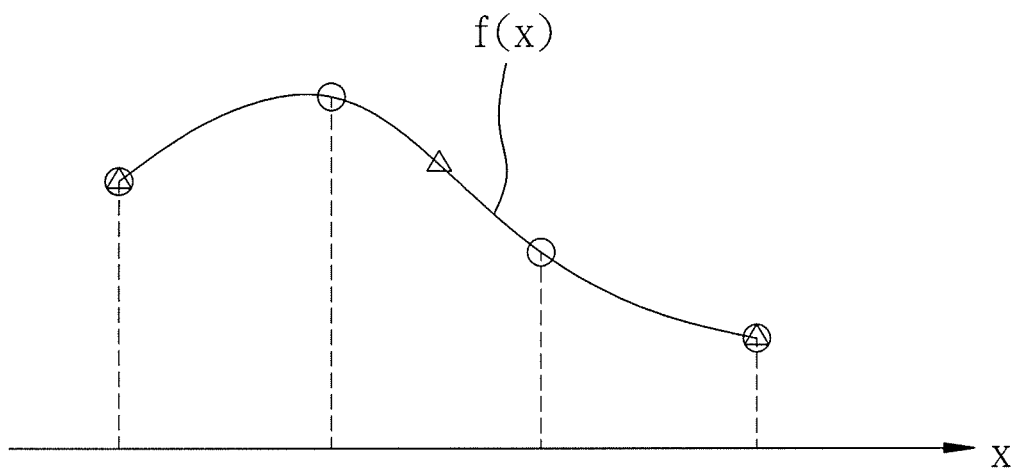
F I G. 5(b)

AUDIO SIGNAL PROCESSING METHOD

CROSS-REFERENCE TO RELATED APPLICATION

This application claims priority of Taiwanese application no. 097112862, filed on Apr. 9, 2008.

BACKGROUND OF THE INVENTION

1. Field of the Invention

The invention relates to an audio signal processing method, more particularly to a variable speed audio signal processing method and apparatus thereof.

2. Description of the Related Art

Time scaling is employed to change length of an audio signal data stream (i.e., change number of data points in an audio signal data stream) without affecting pitch, thereby changing playback speed.

Referring to FIGS. 1(a) and 1(b), time domain harmonic scaling (TDHS) is a frequently used time scaling technique that has the advantage of relatively low computational amount. An audio signal data stream includes a plurality of audio signal segments, and each audio signal segment includes a plurality of data points. As shown in FIG. 1(a), during playback at a relatively slow speed, an audio signal data section (S2) is found from an audio signal segment (S1) and audio signal data appended thereto. The audio signal data section (S2) is spliced to the audio signal segment (S1) to increase the length of the audio signal segment (S1). As shown in FIG. 1(b), during playback at a relatively fast speed, an audio signal segment (S3) and an audio signal segment (S4) are partly spliced together such that an overall length of the audio signal segments (S3, S4) is shortened.

However, in the TDHS technique, if the splice point and the splice segment were not chosen properly, the reproduced sound thus heard will be discontinuous or noise will be generated, thereby lowering the quality of the reproduced sound. Moreover, when an audio signal and a video signal are played back together, the signals must be synchronized regardless of playback at a relatively fast speed or a relatively slow speed so as to ensure that the sounds and images match each other. However, the TDHS technique cannot ensure that the length of an audio signal after change reaches a target length, thereby resulting in non-synchronicity between the sounds and images.

SUMMARY OF THE INVENTION

An object of the present invention is to provide an audio signal processing method capable of fast processing and enhancing the quality of reproduced sound.

According to the present invention, there is provided an audio signal processing method comprising the steps of: dividing an audio signal data stream into a plurality of selection segments; determining a target segment in the audio signal data stream, the target segment including a splice point for splicing a splice segment thereto; selecting one of the selection segments as the splice segment according to at least one parameter of the target segment; and processing the target segment and the splice segment to splice the splice segment to the target segment, and outputting a processed segment.

BRIEF DESCRIPTION OF THE DRAWINGS

Other features and advantages of the present invention will become apparent in the following detailed description of the preferred embodiment with reference to the accompanying drawings, of which:

FIG. 2 is a flowchart of the preferred embodiment of an audio signal processing method according to the present invention;

FIGS. 5(a) and 5(b) are diagrams to illustrate a curve fitting scheme used in the preferred embodiment.

DETAILED DESCRIPTION OF THE PREFERRED EMBODIMENT

Referring to FIGS. 2 and 3(a) to 3(d), the preferred embodiment of an audio signal processing method according to the present invention is shown to comprise the following steps:

Step 21: dividing an audio signal data stream into a plurality of selection segments (C1-CN);

Step 22: determining a target segment (AS) in the audio signal data stream, the target segment (AS) including a splice point 32 for splicing a splice segment (CR) thereto;

Step 23: selecting one of the selection segments (C1-CN) as the splice segment (CR) according to at least one parameter of the target segment (AS); and Step 24: processing the target segment (AS) and the splice segment (CR) to splice the splice segment (CR) to the target segment (AS), and outputting a processed segment (AD).

Figure 1A:
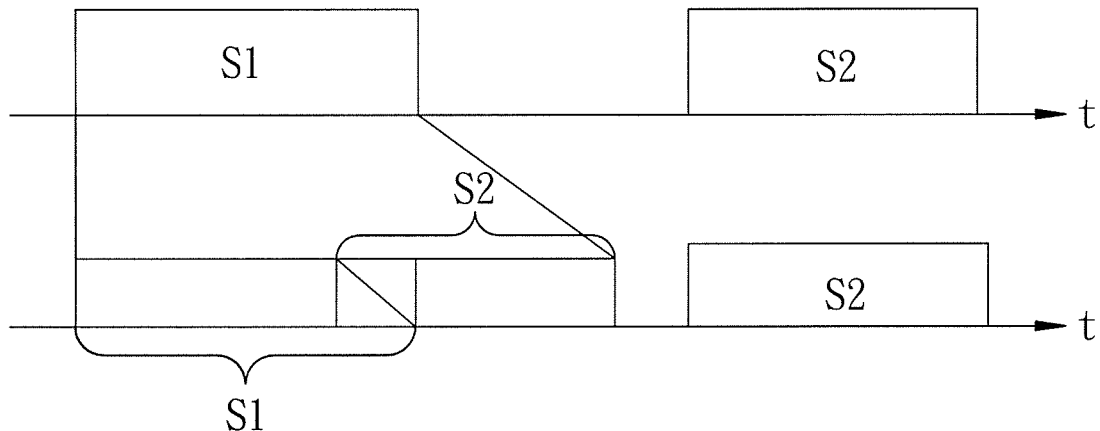
FIGS. 1(a) and 1(b) are diagrams to illustrate the conventional TDHS technique.
Figure 1B:
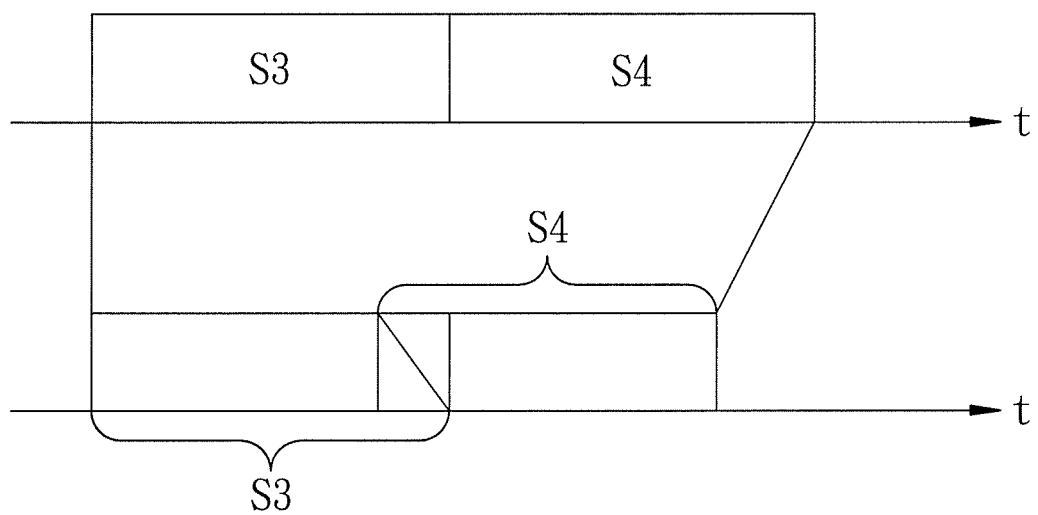
Figure 3A:
FIGS. 3(a) to 3(d) are diagrams to illustrate consecutive steps of the preferred embodiment.
Figure 3B:
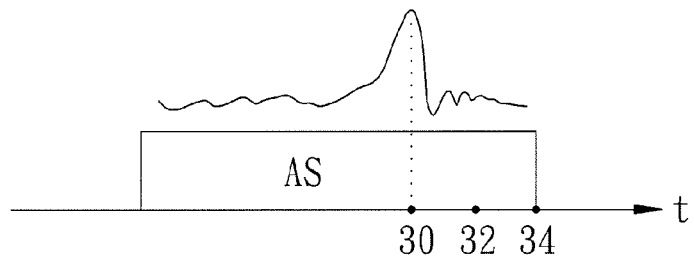
Figure 3C:
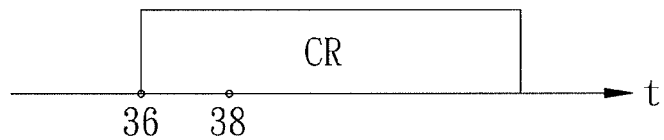
Figure 3D:
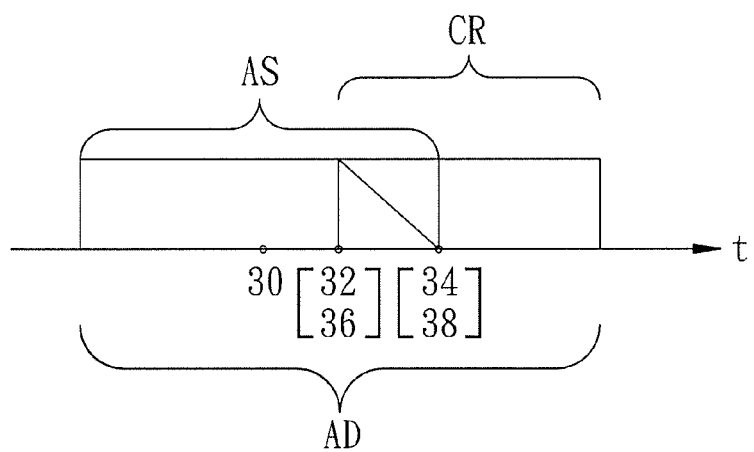

It is apparent from the foregoing that, in an embodiment of the audio signal processing method of this invention, an audio signal data stream is first divided into a plurality of selection segments (C1-CN) (step 21), as best shown in FIG. 3(a). A target segment (AS) is then found from the audio signal data stream for audio signal processing, wherein the target segment (AS) includes a splice point 32 for splicing a splice segment (CR) thereto (step 22), as best shown in FIGS. 3(b) and 3(c). According to shielding effect in sound psychology, the splice point 32 can be chosen as one after a reference point 30 with a relatively large amplitude. According to one embodiment, the amplitude value of the reference point 30 is larger than the average amplitude value of the audio signal data stream. In an embodiment of this invention, in order to find the most appropriate splice segment (CR) from the selection segments (C1-CN), a maximum amplitude, a minimum amplitude and a zero-crossing rate are first calculated for the target segment (AS) and each of the selection segments (C1-CN). Then, one of the selection segments (C1-CN) having the maximum amplitude, the minimum amplitude and the zero-crossing rate closest to the maximum amplitude, the minimum amplitude and the zero-crossing rate of the target segment (AS) is selected as the splice segment (CR) (step 23). The maximum amplitude and the minimum amplitude are used to determine sound volume so as to prevent the volumes of the target segment (AS) and the splice segment (CR) from having an excessively large difference. The zero-crossing rate is used to determine frequency so as to prevent occurrence of the target segment (AS) belonging to a female voice when the splice segment (CR) belongs to a male voice, and vice versa. It should be noted that the present invention should not be limited to selection with reference to the maximum amplitude, the minimum amplitude and the zero-crossing rate as in the preferred embodiment. Other parameters or a subset of the aforementioned three parameters may be used as a basis for selection in other embodiments of the invention. After finding the splice segment (CR), a data portion (from splice point 32 to end point 34) of the target segment (AS) and a data portion (from start point 36 to midpoint 38) of the splice segment (CR) are processed using linear or non-linear overlap and add (OLA) techniques so as to output a processed segment (AD) (step 24), as best shown in FIG. 3(d).

It is noted that all of the steps shown in FIG. 2 can be respectively implemented using a particular circuit. For example, step 21 can be implemented using a dividing circuit, step 22 can be implemented using a determining circuit, step 23 can be implemented using a selecting circuit, and step 24 can be implemented using a processing circuit, such that the functions associated with the steps of the audio signal processing method of this invention can be realized.

Figure 4:
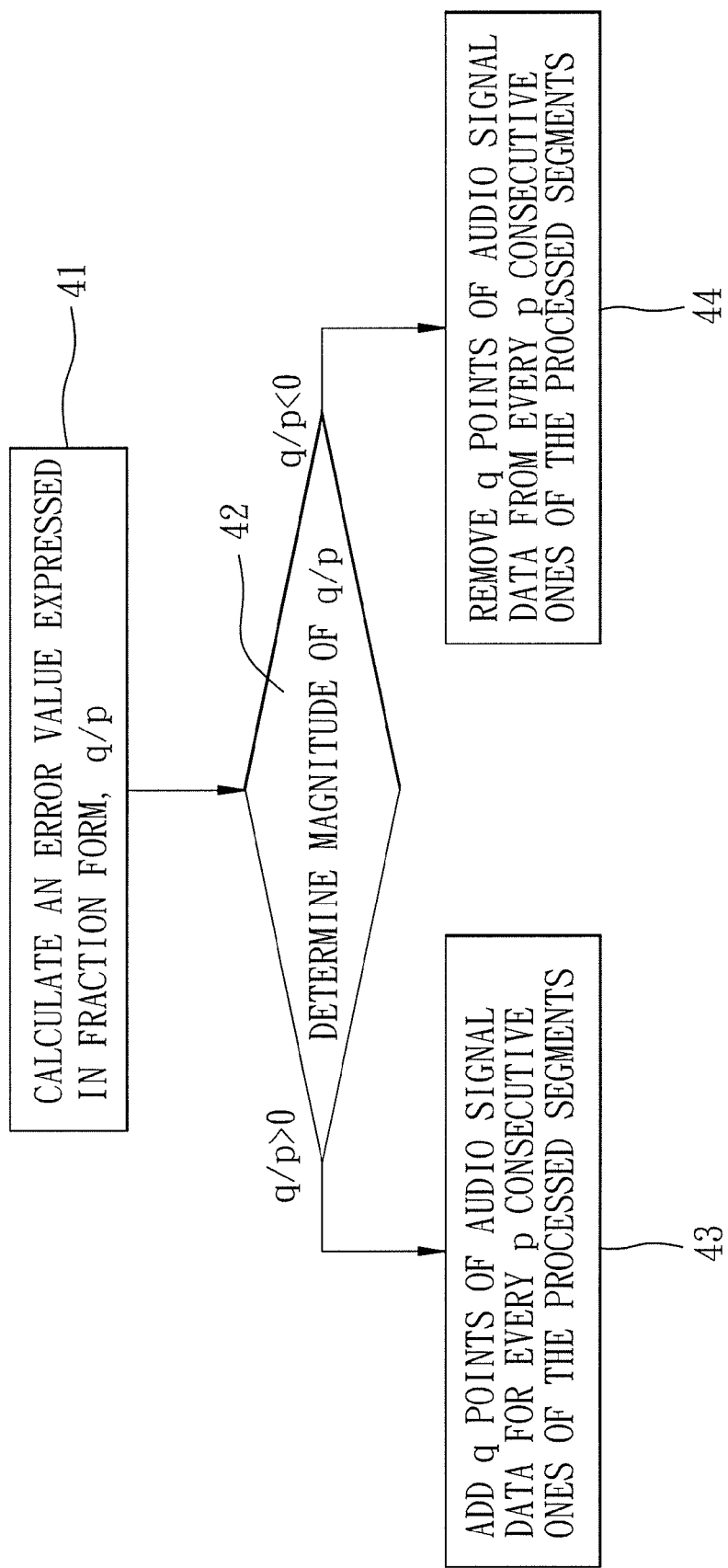
FIG. 4 is a flowchart to illustrate further steps of the preferred embodiment.

Referring to FIG. 4, in order to synchronize audio signals and video signals, the preferred embodiment of the audio signal processing method of the present invention further comprises the following steps:

Step 41: calculating an error value equal to number of target audio signal data points minus number of audio signal data points of the processed segment (AD), the error value being expressed in fraction form, i.e., q/p;

Step 42: determining magnitude of q/p; proceeding to step 43 if q/p>0; and proceeding to step 44 is q/p<0;

Step 43: adding q points of audio signal data for every p consecutive ones of the processed segments (AD); and Step 44: removing q points of audio signal data from every p consecutive ones of the processed segments (AD).

As an example, if the number of audio signal data points of the processed segment (AD) is 258, and the number of target audio signal data points is 258.2, the error value is 0.2, and p can be chosen to be 5, whereas q can be chosen to be 1. For every five consecutive ones of the processed segments (AD), the number of audio signal data points in four of the processed segments (AD) is 258, and the number of audio signal data points in the remaining one of the processed segments (AD) is 259. As a result, the average number of audio signal data points of the five processed segments is 258.2.

There are two schemes available when adding or removing audio signal data in a processed segment (AD).

(1) Curve Fitting Scheme

When u points of audio signal data are to be added in the processed segment (AD), v consecutive points of audio signal data are first arbitrarily selected from the processed segment (AD), and a h-order polynomial function f(x) that can best represent the v points of audio signal data is subsequently found. Thereafter, (v+u) points of audio signal data spaced apart at fixed intervals are found according to the polynomial function f(x) to replace the v points of audio signal data, wherein v>u and h≥v.

Referring to FIG. 5(a), as an example, when 1 point of audio signal data is to be added in the processed segment (AD), 4 consecutive points of audio signal data are first arbitrarily selected from the processed segment (AD), and a $4^{th}$-order polynomial function $f(x)=b_4 x^4+b_3 x^3+b_2 x^2+b_1 x+b_0$ that can best represent the 4 points of audio signal data is subsequently found. Thereafter, 5 points of audio signal data spaced apart at fixed intervals are found according to the polynomial function f(x) to replace the 4 points of audio signal data.

Likewise, when u points of audio signal data are to be removed from the processed segment (AD), v consecutive points of audio signal data are first arbitrarily selected from the processed segment (AD), and a h-order polynomial function f(x) that can best represent the v points of audio signal data is subsequently found. Thereafter, (v−u) points of audio signal data spaced apart at fixed intervals are found according to the polynomial function f(x) to replace the v points of audio signal data, wherein v>u and h≥v.

Referring to FIG. 5(b), as an example, when 1 point of audio signal data is to be removed from the processed segment (AD), 4 consecutive points of audio signal data are first arbitrarily selected from the processed segment (AD), and a $4^{th}$-order polynomial function $f(x)=b_4 x^4+b_3 x^3+b_2 x^2+b_1 x+b_0$ that can best represent the 4 points of audio signal data is subsequently found. Thereafter, 3 points of audio signal data spaced apart at fixed intervals are found according to the polynomial function f(x) to replace the 4 points of audio signal data.

(2) TDHS Scheme

When u points of audio signal data are to be added in the processed segment (AD), the u points of audio signal data immediately after the splice segment (CR) are added to the end of the processed segment (AD). On the other hand, when u points of audio signal data are to be removed from the processed segment (AD), the last u points of audio signal data of the processed segment (AD) are discarded.

Preferably, in step 43, a total of nint(kq/p) points of audio signal data are added to the aforementioned k processed segments (AD), and in step 44, a total of |nint(kq/p)| points of audio signal data are removed from the aforementioned k processed segments (AD), so that the average number of audio signal data points of the processed segments (AD) can reach maximum precision. nint(x) represents an integer closest to (x). If there are two integers closest to (x), any one of the two may be chosen.

In this embodiment, in step 43, the number ($w_i$) of audio signal data points added in an $i^{th}$ processed segment can be expressed as follows:

$$w_i = \begin{cases} nint\left(\dfrac{q}{p}\right), & \text{if } i = 1 \\ nint\left(\dfrac{iq}{p} - \sum_{j=1}^{i-1} w_j\right), & \text{if } i > 1. \end{cases}$$

In this embodiment, in step 44, the number ($w_i$) of audio signal data points removed from an $i^{th}$ processed segment can be expressed as follows:

$$w_i = \begin{cases} \left|nint\left(\dfrac{q}{p}\right)\right|, & \text{if } i = 1 \\ \left|nint\left(\dfrac{iq}{p} + \sum_{j=1}^{i-1} w_j\right)\right|, & \text{if } i > 1. \end{cases}$$

As examples, the numbers ($w_i$) of audio signal data points added in or removed from an $i^{th}$ processed segment when p/q=1/5, 2/5, −1/5 and −2/5 are shown in the following table.

|       | p/q = 1/5 | p/q = 2/5 | p/q = −1/5 | p/q = −2/5 |
|-------|-----------|-----------|------------|------------|
| $w_1$ | 0 | 0 | 0 | 0 |
| $w_2$ | 0 | 1 | 0 | 1 |
| $w_3$ | 1 | 0 | 1 | 0 |
| $w_4$ | 0 | 1 | 0 | 1 |
| $w_5$ | 0 | 0 | 0 | 0 |

In sum, in the method of the present invention, the splice point 32 is found after a point with large amplitude (i.e., the reference point 30), and the splice segment (CR) is found with reference to the maximum amplitudes, the minimum amplitudes, and the zero-crossing rates. As a result, processing speed is faster, and sound reproduction quality is higher. In addition, the average number of audio signal data points of the processed segments (AD) can reach the target audio signal data point number, so that audio signals and video signal can be synchronized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An audio signal processing method, comprising the steps of:
    dividing an audio signal data stream into a plurality of selection segments;
    determining a target segment in the audio signal data stream, the target segment including a splice point for splicing a splice segment thereto;
    selecting one of the selection segments as the splice segment according to at least one parameter of the target segment;
    processing the target segment and the splice segment to splice the splice segment to the target segment, and outputting a processed segment; and
    calculating an error value equal to number of target audio signal data points minus number of audio signal data points of the processed segment, the error value being expressed in fraction form (q/p);
    when q/p>0, adding q points of audio signal data for every p consecutive ones of the processed segments;
    when q/p<0, removing q points of audio signal data from every p consecutive ones of the processed segments; and
    outputting the audio signal data stream, comprising the processed segment with the added or removed points of audio signal data, for playback.

2. The audio signal processing method as claimed in claim 1, wherein the number of audio signal data points of the processed segment is changed using a curve fitting scheme.

3. The audio signal processing method as claimed in claim 2, wherein adding u points of audio signal data in the processed segment includes:
    selecting v consecutive points of audio signal data from the processed segment;
    finding a h-order polynomial function that can best represent the v points of audio signal data; and
    finding (v+u) points of audio signal data spaced apart at fixed intervals according to the polynomial function to replace the v points of audio signal data, wherein v>u and h≥v.

4. The audio signal processing method as claimed in claim 2, wherein removing u points of audio signal data from the processed segment includes:
    selecting v consecutive points of audio signal data from the processed segment;
    finding a h-order polynomial function that can best represent the v points of audio signal data; and
    finding (v-u) points of audio signal data spaced apart at fixed intervals according to the polynomial function to replace the v points of audio signal data, wherein v>u and h≥v.

5. The audio signal processing method as claimed in claim 1, wherein adding u points of audio signal data in the processed segment includes: adding the u points of audio signal data immediately after the splice segment to the end of the processed segment.

6. The audio signal processing method as claimed in claim 1, wherein removing u points of audio signal data from the processed segment includes: discarding the last u points of audio signal data of the processed segment.

7. An audio signal processing method, comprising the steps of:
    dividing an audio signal data stream into a plurality of selection segments;
    determining a target segment in the audio signal data stream, the target segment including a splice point for splicing a splice segment thereto;
    selecting one of the selection segments as the splice segment according to at least one parameter of the target segment;
    processing the target segment and the splice segment to splice the splice segment to the target segment, and outputting a processed segment;
    calculating an error value equal to number of target audio signal data points minus number of audio signal data points of the processed segment; and
    outputting the audio signal data stream, comprising the processed segment with added or removed points of audio signal data, for playback.

8. The audio signal processing method as claimed in claim 7, wherein the number of audio signal data points of the processed segment is changed using a curve fitting scheme.

9. The audio signal processing method as claimed in claim 7, wherein adding u points of audio signal data in the processed segment includes: adding the u points of audio signal data immediately after the splice segment to the end of the processed segment.

10. The audio signal processing method as claimed in claim 7, wherein removing u points of audio signal data from the processed segment includes: discarding the last u points of audio signal data of the processed segment.

* * * * *